US012569707B2

(12) United States Patent
Zhang et al.

(10) Patent No.: US 12,569,707 B2
(45) Date of Patent: Mar. 10, 2026

(54) SPECIAL CONTAINER FOR BATTERY TRANSPORT

(71) Applicant: Yantai Chungway New Energy Technology Co., Ltd., Yantai (CN)

(72) Inventors: Lilei Zhang, Yantai (CN); Guangcai Ju, Yantai (CN); Mingming Li, Yantai (CN); Chunli Wang, Yantai (CN); Xiaotong Shi, Yantai (CN)

(73) Assignee: Yantai Chungway New Energy Technology Co., Ltd., Yantai (CN)

( * ) Notice: Subject to any disclaimer, the term of this patent is extended or adjusted under 35 U.S.C. 154(b) by 851 days.

(21) Appl. No.: 17/894,671

(22) Filed: Aug. 24, 2022

(65) Prior Publication Data

US 2024/0024715 A1 Jan. 25, 2024

(30) Foreign Application Priority Data

Jul. 19, 2022 (CN) ......................... 202210847131.8

(51) Int. Cl.
*A62C 3/16* (2006.01)
*A62C 35/60* (2006.01)
*A62C 35/68* (2006.01)
*B65D 88/02* (2006.01)

(52) U.S. Cl.
CPC ................ *A62C 3/16* (2013.01); *A62C 35/60* (2013.01); *A62C 35/68* (2013.01); *B65D 88/027* (2013.01)

(58) Field of Classification Search
CPC ........... A62C 35/60; A62C 35/68; A62C 3/16; B65D 88/27
USPC ............................................................ 169/54
See application file for complete search history.

(56) References Cited

U.S. PATENT DOCUMENTS 4,197,914 A * 4/1980 Grey ........................ A62C 3/10 114/201 R
11,581,601 B1 * 2/2023 Wickersham ..... H01M 10/6567
2023/0364455 A1 * 11/2023 Kim ....................... A62C 37/38

FOREIGN PATENT DOCUMENTS

CN 211033716 U 7/2020
CN 212501646 U 2/2021
CN 213169139 U 5/2021

* cited by examiner

*Primary Examiner* — Jason J Boeckmann

(57) ABSTRACT

A special container for battery transport is provided. The container includes a container body and a fire extinguishing system. The fire extinguishing system is used for extinguishing a fire in the container. The fire extinguishing system includes a connection device and a firefighting pipeline. The firefighting pipeline conveys a fire extinguishing agent into each container body and discharges the fire extinguishing agent from the container body. An end of the connection device is fixedly connected to a container body wall of the container body. The connection device communicates the firefighting pipeline between two vertically adjacent container bodies.

10 Claims, 3 Drawing Sheets

SPECIAL CONTAINER FOR BATTERY TRANSPORT

CROSS REFERENCE TO RELATED APPLICATIONS

This application claims foreign priority of Chinese Patent Application No. 202210847131.8, filed on Jul. 19, 2022 in the China National Intellectual Property Administration, the disclosures of all of which are hereby incorporated by reference.

TECHNICAL FIELD

The present invention relates to the field of firefighting technology for containers, and specifically to a special container for battery transport.

BACKGROUND

Container transport is a main loading method for transporting cargo in today's world because of its high loading density and high efficiency of transport operations. However, in recent years, at home and abroad, a number of fire and explosion accidents of container cargo have occurred. Therefore, firefighting for shipping containers requires special attention.

Ship's hold: To maximize a loading capacity, a high-density arrangement including a plurality of layers and columns is adopted. Operation channels are left in the middle of a container group, through which operators may carry out necessary operations of non-large devices.

Ship's deck, shore, and other container stacking areas: The arrangement density of containers is slightly lower than that in a hold (mainly because there are a number of channels in the container group and the channels occupy a large area), operators carry out operations through the channels.

The main characteristics that lead to accidents of shipping containers are as follows.

1. Lack of Early Warning Means for Internal Detection of Existing Shipping Containers Containers remain in a closed state during transport. A person outside cannot observe the actual status inside a container, and there is no means of effective monitoring and abnormal warning of an interior of a container in a closed state, making it impossible to directly implement firefighting measures.

2. Complex Stacking Status of Containers

Shipping containers are usually shipped by sea. In sea freighters, containers are often stacked both on the deck and in a cargo hold. Containers are sometimes piled on the deck in up to five or six layers. Space in front and behind stacked containers is small. If an accident container is located in the middle of a hull, the stacking of containers around the accident container causes enormous space difficulty in the rescue. If an accident container is located in a cargo hold and containers are also stacked on the deck, the rescue is more difficult.

3. Difficult Disposal of Accident Containers

A container ship is generally not equipped with handling equipment and cannot dispose of an accident container. The failure of disposing of the accident container off the ship in time may cause rapid expansion and spread of the accident and increase the intensity of rescue.

4. Lack of Means of Suppression after Thermal Runaway Inside Containers of an External Supporting Fire Extinguishing Device If an accident occurs in a port, a ship can be quickly rescued in the port. If an accident occurs in the open sea, the support of fire extinguishing force is highly unlikely, and the rescue can only rely on external firefighting means. Fixed-point fire control cannot be performed on an abnormal container, causing great difficulty to a ship's self-rescue.

(1) An existing hold firefighting system is mainly a fire detection and alarm system and a gas fire extinguishing system configured in a hold. An operator extinguishes a fire in an early stage by using a hand-held fire extinguisher. If a fire reaches a certain level, the hold is closed, and full submerged gas fire extinguishing is carried out by using an automatic fire extinguishing system.

(2) A deck firefighting system is mainly formed by a plurality of groups of fire pumps, fire hydrants, and fire hoses. When a fire occurs, an operator extinguishes the fire by using a hand-held fire extinguisher or a fire nozzle.

The above is an introduction to the current status of firefighting for conventional shipping containers.

With the rapid development of new energy battery technology, electric vehicles and other products have been well promoted in most countries around the world, and batteries are exported from one country to another. When shipped by sea, batteries are loaded in containers.

During transport or storage of batteries (especially lithium-ion batteries) or equipment containing batteries in containers, because the initiation and development characteristics (for example, easy reignition) of battery fires are different from other loaded cargo and containers have higher sealing performance, it is difficult to quickly and effectively extinguish a fire through external firefighting measures (including a handheld extinguishing system, a gas fire extinguishing system, a fire nozzle, and the like). Therefore, there are significant safety risks in shipping batteries and other similar cargo in containers.

Frequent fire accidents of containerized energy storage power plants and electric vehicles are typical cases of the difficulty in extinguishing fires of batteries. If a fire occurs in shipping, aviation, and other transport fields, because it is difficult to move containers within a short period of time as well as the external limitations and internal conditions of shipping containers as described above, huge irreparable damage or disaster may be caused.

SUMMARY

An objective of the present invention is to provide a special container for battery transport to overcome the deficiencies in the prior art. The container is applicable to a transport process of shipping containers or the piling of shipping containers on a dock and other places. A series fire extinguishing mode among each column of stacked containers is implemented through the innovation of a connection device, and full submerged fire extinguishing in an interior of an accident container is implemented by a central control device, a detection device, a driving device, a control valve, and the like.

The objective of the present invention is achieved by using the following technical measure: A special container for battery transport includes a container body and a fire extinguishing system. The fire extinguishing system is used for extinguishing a fire in the container. The fire extinguishing system includes a connection device and a firefighting pipeline. The firefighting pipeline conveys a fire extinguishing agent into each container body and discharges the fire extinguishing agent from the container body. An end of the connection device is fixedly connected to a container body wall of the container body. The connection device communicates the firefighting pipeline between two vertically adjacent container bodies.

Further, the connection device includes a telescopic mechanism and a receptacle mechanism, the telescopic mechanism is inserted in the receptacle mechanism, the telescopic mechanism and the receptacle mechanism are detachably connected, and the telescopic mechanism or the receptacle mechanism is fixedly mounted at a top of the container body; when the telescopic mechanism is mounted at the top of the container body, the receptacle mechanism is fixedly mounted at a bottom of the container body; and when the receptacle mechanism is mounted at the top of the container body, the telescopic mechanism is fixedly mounted at the bottom of the container body.

Further, the firefighting pipeline includes a liquid discharge firefighting pipe, an end of the liquid discharge firefighting pipe is in communication with an interior of the container body, an on-off valve is arranged at a discharge end of the liquid discharge firefighting pipe, the on-off valve controls whether the discharge end of the liquid discharge firefighting pipe discharges the fire extinguishing agent outside, and the on-off valve is a manual valve or an electric valve or a manual electric valve.

Further, a liquid discharge port is provided in the container body, the liquid discharge firefighting pipe is in communication with the interior of the container body through the connection device or a connector, and the connection device or the connector is fixedly connected to the liquid discharge port.

Further, the liquid discharge port is provided at a container body end portion or the bottom of the container body.

Further, when the liquid discharge firefighting pipe is in communication with the interior of the container body through the connection device and the liquid discharge port, the telescopic mechanism or the receptacle mechanism is fixedly mounted on the liquid discharge port; when the telescopic mechanism is mounted on the liquid discharge port, mounting ends of the telescopic mechanism and the receptacle mechanism extend to an exterior of the container body, the other end of the telescopic mechanism extends to the interior of the container body, and correspondingly the receptacle mechanism used in pair is mounted on the liquid discharge firefighting pipe; and when the receptacle mechanism is mounted on the liquid discharge port, mounting ends of the receptacle mechanism and the telescopic mechanism extend to the exterior of the container body, the other end of the receptacle mechanism extends to the interior of the container body, and correspondingly the telescopic mechanism used in pair is mounted on the liquid discharge firefighting pipe.

Further, the firefighting pipeline includes a liquid feed firefighting pipe, a liquid feed port is provided at the top of the container body or a container body end portion of the container body, and the liquid feed firefighting pipe is connected to an interior of the container body through the connection device and the liquid feed port; or an end of the liquid feed firefighting pipe is mounted at the liquid feed port through a one-way connector and a multi-way connector; when the telescopic mechanism is mounted on the liquid feed port, accordingly the receptacle mechanism is mounted on the liquid feed firefighting pipe; and when the receptacle mechanism is mounted on the liquid feed port, accordingly the telescopic mechanism is mounted on the liquid feed firefighting pipe.

Further, when the liquid feed firefighting pipe is mounted at the liquid feed port through a one-way connector and a multi-way connector, the liquid feed firefighting pipe is one independent pipeline or a plurality of pipelines; when one independent pipeline is used, the one-way connector is used for each container body to independently feed a liquid; and when a plurality of pipelines are used, a plurality of container bodies are connected to each other by the one-way connector and the multi-way connector in combination, and a flexible pipe is used for the liquid feed firefighting pipe.

Further, the telescopic mechanism includes an inner cylinder, an outer cylinder, an outer cylinder sleeve, and a universal ball joint, the outer cylinder is a hollow structure, one end of the outer cylinder is connected to the container body, the other end of the outer cylinder is connected to the outer cylinder sleeve, one end of the inner cylinder extends in a direction of the outer cylinder sleeve into the hollow structure of the outer cylinder and penetrates the end of the outer cylinder connected to the container body, the other end of the inner cylinder is connected to one end of the universal ball joint, the inner cylinder and the outer cylinder are hermetically connected, the outer cylinder sleeve and the inner cylinder are hermetically connected, an external driving interface penetrates a wall thickness of the outer cylinder, a medium is introduced through the external driving interface to drive extension and retraction of the inner cylinder in the outer cylinder, a conical surface is provided at the other end of the universal ball joint, the conical surface facilitates convenient insertion into the receptacle mechanism, a ball joint seal ring is provided at a circumference of the conical surface, an inserted seal between the telescopic mechanism and the receptacle mechanism is implemented by the ball joint seal ring, a channel is opened in the universal ball joint, and the channel is joined to the inner cylinder.

Further, the receptacle mechanism includes a connection piping and a universal ball joint holder, one end of the connection piping is mounted in the universal ball joint holder, the other end of the connection piping is connected to the container body, a conical frustum, and a circular through hole are provided in the universal ball joint holder, the conical frustum and the circular through hole are joined and penetrate a length direction of the universal ball joint holder, the conical frustum facilitates insertion of the telescopic mechanism, and the circular through hole and the connection piping are joined to form a fire extinguishing agent flow channel.

Further, the fire extinguishing system includes a driving device, the driving device is arranged on the exterior of the container body, the driving device is connected to a firefighting device, and the driving device supplies power for introducing the fire extinguishing agent to the interior of the container body.

Further, the fire extinguishing system includes a detection device, the detection device detects a fire in the container body, the detection device is mounted at an upper portion in the interior of the container body, and the detection device is a combination of various single detectors or a composite detector or a video detector or a grating detector or an infrared detector.

Further, the fire extinguishing system includes backend surveillance, a liquid level device, and a power supply device, the liquid level device is mounted in the interior of the container body, a horizontal mounting height of the liquid level device is not lower than a maximum horizontal plane of cargo in the container, the liquid level device is respectively electrically connected to the power supply device and the backend surveillance, the liquid level device transmits a liquid level in the interior of the container body to the backend surveillance in real time, and the backend surveillance determines, based on a change in the liquid level, whether to continue to convey the fire extinguishing agent into the container body.

Further, the fire extinguishing system includes an intra-container fire extinguishing line, the intra-container fire extinguishing line includes a control valve, a first three-way valve, and a second three-way valve, interfaces at two ends of the first three-way valve are respectively joined to a liquid feed port and a liquid outlet port of the container body, the remaining interface of the first three-way valve is joined to one end of the control valve, interfaces at two ends of the second three-way valve are respectively joined to the other end of the control valve and a liquid discharge port of the container body, the remaining interface of the second three-way valve conveys the fire extinguishing agent into the container body, and the control valve controls whether the fire extinguishing agent flows through the second three-way valve.

Compared with the prior art, the beneficial effects of the present invention are as follows: A detection device is arranged in an interior of a container. The detection device can monitor the interior of the closed container in real time. An accident container can be located according to the signal feedback from the detection device to provide the prerequisite for targeted fire extinguishing. A driving device, the detection device, a control valve, and the like are controlled by using a central control device, so that full submerged fire extinguishing is carried out in a targeted manner in the interior of the accident container by using a fire extinguishing agent. The most important thing of the present invention is to implement series fire extinguishing among each column of stacked containers by using a connection device. A fire extinguishing pipeline, which includes an intra-container fire extinguishing line and a firefighting pipeline, is laid in the interiors of the containers, and one liquid feed port is provided for each column of stacked containers so that the fire extinguishing agent can be conveyed to the interior of each container in the column. In addition, the connection device meets the space requirements of the stacked containers and the normal lifting and fixing requirements of two vertically adjacent containers. An existing container structure does not need to be changed. The connection device meets the lifting requirements of containers by using a detachable insertion method, that is, quick separation as well as insertion and joining of the connection device in a lifting process.

The present invention will be described below in detail by referring to the accompanying drawings and specific implementations.

BRIEF DESCRIPTION OF THE DRAWINGS

FIG. 5 is a schematic structural diagram of a receptacle mechanism in a connection device.

Figure 1:
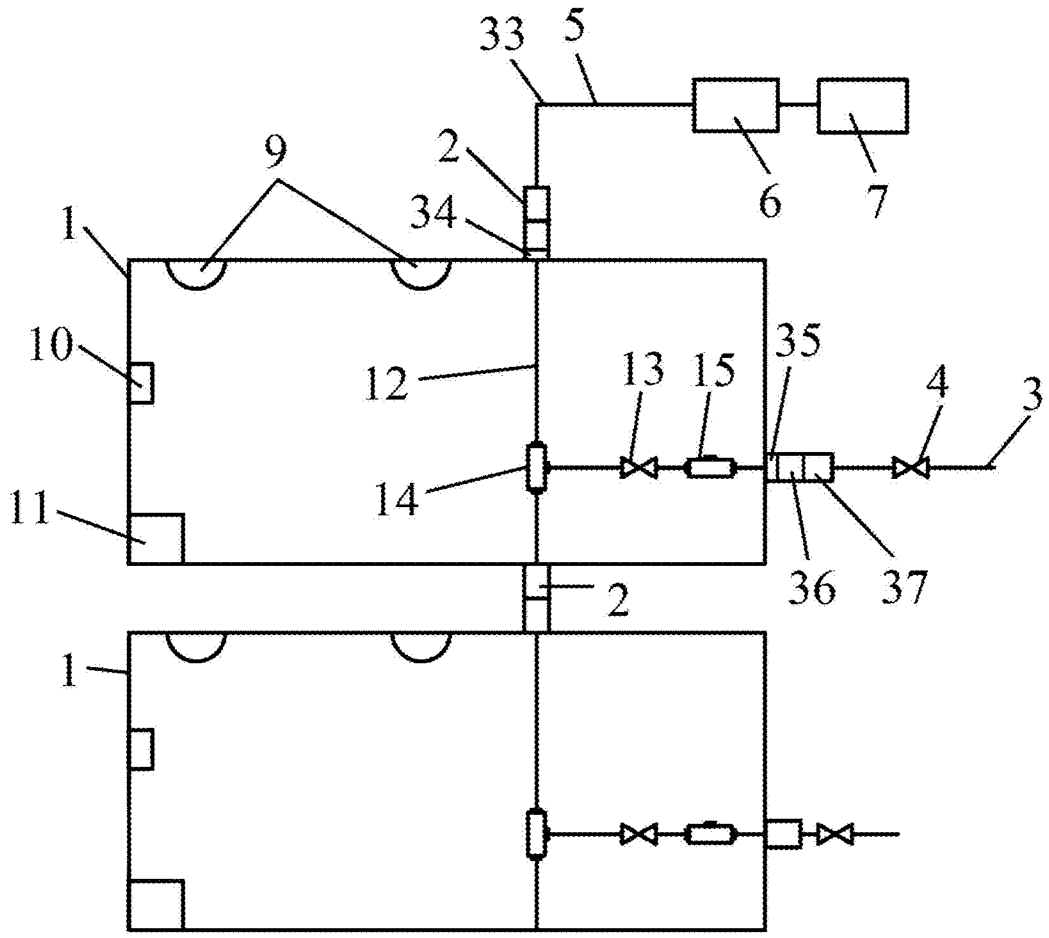
FIG. 1 is a schematic structural diagram of a special container for battery transport.

Where: 1. container body, 2. connection device, 3. liquid discharge firefighting pipe, 4. on-off valve, 5. liquid feed firefighting pipe, 6. driving device, 7. firefighting device, 8. backend surveillance, 9. detection device, 10. liquid level device, 11. power supply device, 12. intra-container fire extinguishing line, 13. control valve, 14. first three-way valve, 15. second three-way valve, 16. inner cylinder, 17. outer cylinder, 18. outer cylinder sleeve, 19. universal ball joint, 20. seal groove, 21. groove, 22. external driving interface, 23. conical surface, 24. ball joint seal ring, 25. connection piping, 26. universal ball joint holder, 27. conical frustum, 28. circular through hole, 29. first thread, 30. second thread, 31. third thread, and 32. fourth thread.

DESCRIPTION OF THE EMBODIMENTS

As shown in FIG. 1 to FIG. 5, a special container for battery transport includes a container body 1 and a fire extinguishing system. The fire extinguishing system is used for extinguishing a fire in the container. The fire extinguishing system includes a firefighting device 7, a connection device 2, and a firefighting pipeline 33. The firefighting device 7 extinguishes a fire in the container body 1. The firefighting pipeline is joined to the firefighting device 7. The firefighting pipeline conveys a fire extinguishing agent in the firefighting device 7 into each container body 1 and discharges the fire extinguishing agent from the container body 1. There are a plurality of connection devices 2. An end of each connection device 2 is fixedly connected to a container body wall of the container body 1. The connection device 2 communicates the firefighting pipeline between two vertically adjacent container bodies 1. The firefighting device 7 may use an external water source (for example, fresh water on a ship or seawater), another liquid fire extinguishing agent, or the like. The fire extinguishing agent may be firewater, perfluoro (2-methyl-3-pentanone), or another cooling fire extinguishing agent. The connection device 2 communicates the fire extinguishing pipeline between two vertically adjacent containers so that one liquid feed flows through every one of containers stacked in a single column. Through the connection device 2, an existing container structure does not need to be changed. It is only necessary to mount and fix the connection device 2 on a container body.

The connection device 2 includes a telescopic mechanism 36 and a receptacle mechanism 37. The telescopic mechanism is inserted in the receptacle mechanism. The telescopic mechanism and the receptacle mechanism are detachably connected. The telescopic mechanism or the receptacle mechanism is fixedly mounted at a top of the container body 1. When the telescopic mechanism is mounted at the top of the container body 1, the receptacle mechanism is fixedly mounted at a bottom of the container body 1. When the receptacle mechanism is mounted at the top of the container body 1, the telescopic mechanism is fixedly mounted at the bottom of the container body 1. The telescopic mechanism includes an inner cylinder 16, an outer cylinder 17, an outer cylinder sleeve 18, and a universal ball joint 19. The outer cylinder 17 is a hollow structure. One end of the outer cylinder 17 is connected to the container body 1 by a third thread 31, and the other end of the outer cylinder 17 is connected to the outer cylinder sleeve 18 by a fourth thread 32. One end of the inner cylinder 16 extends in a direction of the outer cylinder sleeve 18 into the hollow structure of the outer cylinder 17 and penetrates the end of the outer cylinder 17 connected to the container body 1, and the other end of the inner cylinder 16 extends into the universal ball joint 19 and is connected to one end of the universal ball joint 19 by a first thread 29. The inner cylinder 16 and the outer cylinder 17 are hermetically connected. Specifically, a seal groove 20 is provided in an outer wall of the inner cylinder 16. The seal groove 20 is opened at an end away from the outer cylinder sleeve 18. A seal ring is filled in the seal groove 20. The outer cylinder sleeve 18 and the inner cylinder 16 are hermetically connected. A groove 21 is provided in an inner wall of the outer cylinder sleeve 18. A sealing material is filled in the groove 21. An external driving interface 22 penetrates a wall thickness of the outer cylinder 17. The external driving interface 22 is arranged between the seal groove 20 and the groove 21. A medium 39 is introduced through the external driving interface 22 to drive extension and retraction of the inner cylinder 16 in the outer cylinder 17. The medium 39 may be compressed air, a hydraulic fluid, or the like. In the case of compressed air, a component such as an air compressor 40 or an air pump is arranged in an interior of a container. The air compressor 40 is in communication with the external driving interface 22 through a pipeline 41, and introduces generated compressed air into the external driving interface 22 through the pipeline 41. A conical surface 23 is provided at the other end of the universal ball joint 19. The conical surface 23 facilitates convenient insertion into the receptacle mechanism. A ball joint seal ring 24 is provided at a circumference of the conical surface 23. An inserted seal between the telescopic mechanism and the receptacle mechanism is implemented by the ball joint seal ring 24. That is, the conical surface 23 is inserted into a conical frustum 27. The diameter of the conical surface 23 increases and the diameter of the conical frustum 27 decreases during the insertion. The insertion starts as the minimum diameter of the conical surface 23 meets the maximum diameter of the conical frustum 27, to implement an initial joint. As the insertion continues, the maximum diameter of the conical surface 23 reaches the minimum diameter of the conical frustum 27. The conical surface 23 and the conical frustum 27 are closed. The ball joint seal ring 24 on the conical surface 23 implements the sealed connection between the conical surface 23 and the conical frustum 27. A channel 38 is opened in the universal ball joint 19. The channel is joined to the inner cylinder 16. The receptacle mechanism includes a connection piping 25 and a universal ball joint holder 26. One end of the connection piping 25 is mounted in the universal ball joint holder 26, and the other end of the connection piping 25 is connected to the container body 1 by a second thread 30. The conical frustum 27 and a circular through hole 28 are provided in the universal ball joint holder 26. The conical frustum 27 and the circular through hole 28 are joined and penetrate a length direction of the universal ball joint holder 26. The conical frustum 27 facilitates insertion of the telescopic mechanism. The circular through hole 28 and the connection piping 25 are joined to form a fire extinguishing agent flow channel. The structure of the connection device 2 can further satisfy the requirements of lifting and separation or lifting and stacking of containers, so that the fire extinguishing pipeline can be quickly inserted and joined and quickly detached and separated between two vertically adjacent containers.

A liquid discharge port 35 is provided at a container body end portion or the bottom of the container body 1. Alternatively, for the liquid discharge of a container, a bottom connection outlet that is provided in a single container and is used for communicating two adjacent containers may be reused for liquid discharge. The firefighting pipeline 33 includes a liquid discharge firefighting pipe 3. An end of the liquid discharge firefighting pipe 3 is in communication with an interior of the container body 1 through the connection device 2. An end of the connection device 2 is fixed at the liquid discharge port. This case is applicable to a case that the liquid discharge port is mounted at the bottom. Alternatively, an end of the liquid discharge firefighting pipe 3 is mounted with the liquid discharge port through a one-way connector and a multi-way connector. This case is applicable to both a connection to a liquid discharge port at an end portion and a connection to a liquid discharge port at the bottom. An on-off valve 4 is arranged at a discharge end of the liquid discharge firefighting pipe 3. The on-off valve 4 controls whether the discharge end of the liquid discharge firefighting pipe 3 discharges the fire extinguishing agent outside. The on-off valve 4 is a manual valve or an electric valve or a manual electric valve. The technology of the present invention is full submerged fire extinguishing for an interior of a container and is fire extinguishing performed for a special container for battery transport. For characteristics of a battery catching a fire, a fire extinguishing agent needs to continuously reduce the temperature of the battery on fire. Therefore, the most important function of the liquid discharge port added to the container body 1 is to discharge a fire extinguishing agent with an increased temperature, to provide space for feeding a new fire extinguishing agent. After containers are lifted and stacked, the liquid discharge firefighting pipe 3 is joined and mounted on a single container body 1 by using the detachable quick insertion of the connection device 2. The on-off valve 4 is normally closed and is only opened when a fire occurs in an interior of a corresponding container body 1 and a liquid needs to be discharged.

When the liquid discharge firefighting pipe 3 is in communication with the interior of the container body 1 through the connection device 2, the telescopic mechanism or the receptacle mechanism is fixedly mounted on the liquid discharge port. When the telescopic mechanism is mounted on the liquid discharge port, mounting ends of the telescopic mechanism and the receptacle mechanism extend to an exterior of the container body 1, the other end of the telescopic mechanism extends to the interior of the container body 1, and correspondingly the receptacle mechanism used in pair is mounted on the liquid discharge firefighting pipe 3. When the receptacle mechanism is mounted on the liquid discharge port, mounting ends of the receptacle mechanism and the telescopic mechanism extend to the exterior of the container body 1, the other end of the receptacle mechanism extends to the interior of the container body 1, and correspondingly the telescopic mechanism used in pair is mounted on the liquid discharge firefighting pipe 3.

When the liquid discharge firefighting pipe 3 is mounted at the liquid discharge port through a one-way connector and a multi-way connector, the liquid discharge firefighting pipe 3 is one independent pipeline or a plurality of pipelines. When one independent pipeline is used, the one-way connector is used for each container body 1 to independently discharge a liquid. When a plurality of pipelines are used, a plurality of container bodies 1 are connected to each other by the one-way connector and the multi-way connector in combination, and a flexible pipe is used for the liquid discharge firefighting pipe 3. The flexible pipe can better compensate for a gap error between stacked containers. Next, after containers are lifted, stacked, and fixed, a connector interval between the containers is fixed. Therefore, the flexible pipe can implement a mounting requirement of fixing an interval between containers.

The firefighting pipeline includes a liquid feed firefighting pipe 5. A liquid feed port 34 is provided at the top of the container body 1 or a container body end portion of the container body 1. The liquid feed firefighting pipe 5 is in communication with the interior of the container body 1 through the connection device 2. An end of the connection device 2 is fixedly mounted at the liquid feed port. This case is applicable to a case that the liquid feed firefighting pipe 5 is arranged at the top of the container body 1. Alternatively, the liquid feed firefighting pipe 5 is mounted with the liquid feed port through a one-way connector and a multi-way connector. This case is applicable to both a connection to a liquid inlet port at the top of the container body 1 and a connection to a liquid feed port at an end portion of the container body 1. When the telescopic mechanism is mounted on the liquid feed port, accordingly the receptacle mechanism is mounted on the liquid feed firefighting pipe 5. When the receptacle mechanism is mounted on the liquid feed port, accordingly the telescopic mechanism is mounted on the liquid feed firefighting pipe 5. When the liquid feed firefighting pipe 5 is mounted at the liquid feed port through a one-way connector and a multi-way connector, the liquid feed firefighting pipe 5 is one independent pipeline or a plurality of pipelines. When one independent pipeline is used, the one-way connector is used for each container body 1 to independently feed a liquid. When a plurality of pipelines are used, a plurality of container bodies 1 are connected to each other by the one-way connector and the multi-way connector in combination. Eventually, after a liquid is fed through one header liquid feed pipe, the fire extinguishing agent may be separately conveyed into a plurality of containers in communication. In this case, a flexible pipe is used for the liquid feed firefighting pipe 5.

The fire extinguishing system includes a driving device 6. The driving device 6 is arranged in an exterior of the container body 1. The driving device 6 is connected to a firefighting device 7. The driving device 6 supplies power for introducing the fire extinguishing agent to the interior of the container body 1. The driving device 6 may be a pump or another device.

The fire extinguishing system includes a detection device 9. The detection device 9 detects a fire in the container body 1. The detection device 9 is mounted at an upper portion in the interior of the container body 1. The detection device 9 is a combination of various single detectors or a composite detector or a video detector or a grating detector or an infrared detector. One or more detection devices 9 are mounted in each container body 1, specifically, at an upper portion of a circumferential sidewall of the container body 1 or on a top sidewall of the container body 1. If a combination of various single detectors or a composite detector is used, elements to be detected usually include temperature, smoke, hydrogen, CO, $CO_2$, and the like. The detection device 9 in each container body 1 is separately encoded. The detection device 9 is electrically and communicatively connected to backend surveillance 8. A detection device 9 that encounters an abnormality transmits information to the backend surveillance 8. The backend surveillance 8 performs analysis to locate a container.

The fire extinguishing system further includes the backend surveillance 8, a power supply device 11, and a liquid level device 10. One or more liquid level devices 10 are mounted in the interior of the container body 1. However, a horizontal mounting height of the liquid level device 10 is not lower than a maximum horizontal plane of cargo in the container. Further, the liquid level device 10 is as close as possible to the top of the container. The liquid level device 10 is electrically and communicatively connected to the backend surveillance 8. The liquid level device 10 transmits a liquid level in the interior of the container body 1 to the backend surveillance 8 in real time. The backend surveillance 8 determines, based on a change in the liquid level, whether to continue to convey the fire extinguishing agent into the container body 1. A specific communication mode used in the present invention is CAN communication. The power supply device 11 supplies power to the liquid level device 10, the detection device 9, and a control valve 13 in the container body 1 or may be independently used as a backup power device. When power cannot be normally supplied from outside, the detection device 9, the liquid level device 10, and the control valve 13 in the interior are powered by using the backup power device, to ensure that the system operates normally. The driving device 6, the detection device 9, the control valve 13, and the like are controlled by using a controller 42.

The fire extinguishing system includes an intra-container fire extinguishing line 12. The intra-container fire extinguishing line 12 includes a control valve 13, a first three-way valve 14, and a second three-way valve 15. Interfaces at two ends of the first three-way valve 14 are respectively joined to a liquid feed port and a liquid outlet port of the container body 1. The remaining interface of the first three-way valve 14 is joined to one end of the control valve 13. Interfaces at two ends of the second three-way valve 15 are respectively joined to the other end of the control valve 13 and a liquid discharge port of the container body 1. The remaining interface of the second three-way valve 15 conveys the fire extinguishing agent into the container body 1. The control valve 13 controls whether the fire extinguishing agent flows through the second three-way valve 15.

Figure 2:
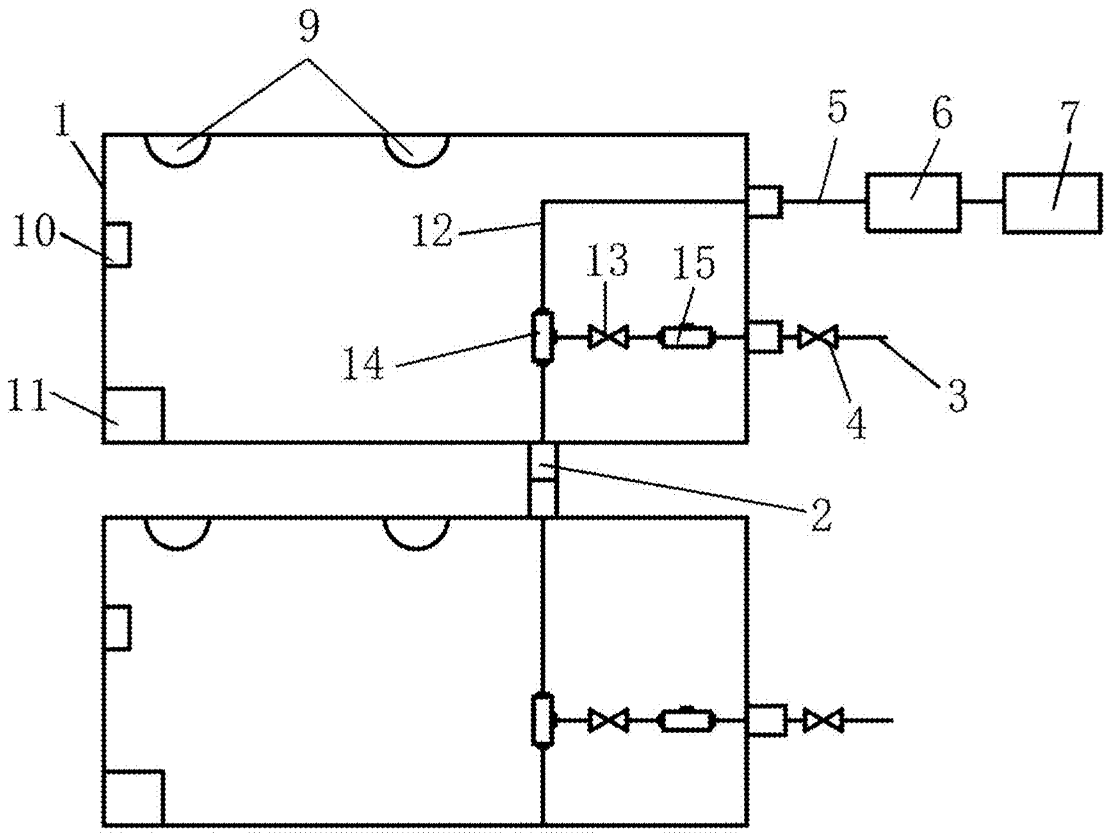
FIG. 2 is another schematic structural diagram of a special container for battery transport.
Figure 3:
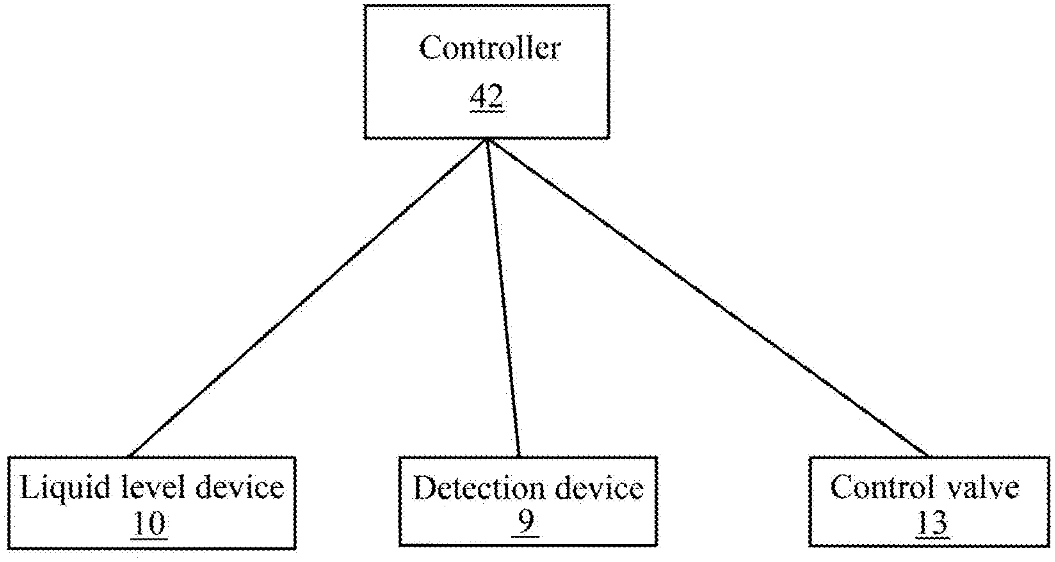
FIG. 3 is a control flowchart of a special container for battery transport.
Figure 4:
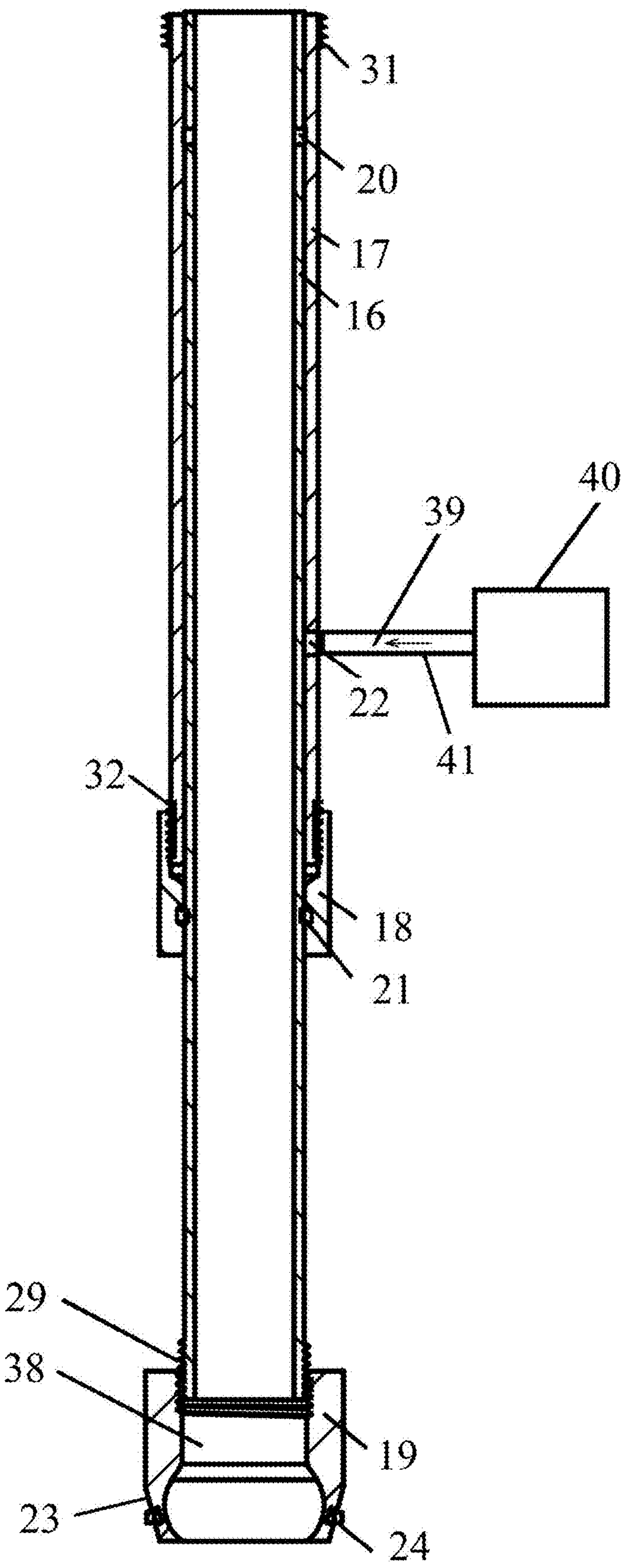
FIG. 4 is a schematic structural diagram of a telescopic mechanism in a connection device.

FIG. 1 in the present invention shows that the liquid feed firefighting pipe 5 feeds a liquid from the top of the container body 1, that is, feeds a liquid to the topmost container body 1 in a single column of containers. FIG. 2 in the present invention shows that the liquid feed firefighting pipe 5 feeds a liquid from the end portion of the container body 1. Either of the two liquid feed modes is selected. FIG. 1 and FIG. 2 show that the liquid feed firefighting pipe 5 is joined to the container body 1 through the connection device 2. Certainly, according to the technical solution of the present invention, the liquid feed firefighting pipe 5 may be joined to the container body 1 through a conventional connector. FIG. 1 and FIG. 2 show that the liquid discharge firefighting pipe 3 discharges a liquid from the end portion of the container body 1 through the connection device 2. Certainly, according to the technical solution of the present invention, the liquid discharge firefighting pipe 3 may be joined to the container body 1 through a conventional connector to discharge a liquid. According to the technical solution in the present invention, in addition to the discharge of a liquid in the container body 1 to the outside through the liquid discharge port arranged at the end portion, a liquid discharge port may be provided in the bottom of the container body 1, or a liquid may be discharged from the bottom of a bottommost container body 1 of a single column of containers. FIG. 1 and FIG. 2 in the present invention show that the intra-container fire extinguishing line 12 is included in the interior of each container body 1. According to the technical solution in the present invention, the intra-container fire extinguishing line 12 may be omitted.

In the description of the present invention, it needs to be understood that orientation or location relationships indicated by terms "up", "middle", "outside", and "inside" are only used to facilitate the description of the present invention and simplify description, but are not used to indicate or imply that the components or elements must have specific orientations or are constructed and operated by using specific orientations, and therefore, cannot be understood as a limit to the present invention.

It is apparent to those skilled in the art that the present invention is not limited to the details in the foregoing exemplary embodiments, and the present invention can be implemented in other specific forms without departing from the spirit or basic features of the present invention. Therefore, from all perspectives, the embodiments should be considered to be exemplary and non-limitative. The scope of the present invention is defined by the appended claims instead of the foregoing description. Therefore, all changes that fall within the meanings and scope of equivalent elements of the claims are intended to be covered by the present invention. Any reference numeral in the claims should not be construed as limiting the related claims.

In addition, it should be understood that although the specification is described according to the implementations, each implementation does not necessarily include only one independent technical solution. The description manner of the specification is only used for clarity, and a person skilled in the art should consider the specification as a whole. The technical solutions in the embodiments may be appropriately combined to form other implementations comprehensible to a person skilled in the art.

The invention claimed is:

1. A special container for battery transport, comprising a container body and a fire extinguishing system, the fire extinguishing system being used for extinguishing a fire in the container, wherein the fire extinguishing system comprises connection devices and a firefighting pipeline, the firefighting pipeline conveys a fire extinguishing agent into the container body and discharges the fire extinguishing agent from the container body through the connection devices, the connection devices are fixedly connected to a container body wall of the container body;

wherein each of the connection devices comprises a telescopic mechanism and a receptacle mechanism, the telescopic mechanism is configured to be inserted in the receptacle mechanism, the telescopic mechanism and the receptacle mechanism are detachably connected, the receptacle mechanism is fixedly mounted at a top of the container body, and the telescopic mechanism is fixedly mounted at a bottom of the container body; and the telescopic mechanism comprises an inner cylinder, an outer cylinder, an outer cylinder sleeve, and a universal ball joint, wherein the outer cylinder is a hollow structure, one end of the outer cylinder is connected to the container body, another end of the outer cylinder is connected to the outer cylinder sleeve, one end of the inner cylinder extends in a direction of the outer cylinder sleeve into the hollow structure of the outer cylinder and penetrates the end of the outer cylinder connected to the container body, another end of the inner cylinder is connected to one end of the universal ball joint, the inner cylinder and the outer cylinder are hermetically connected, the outer cylinder sleeve and the inner cylinder are hermetically connected, an external driving interface penetrates a wall thickness of the outer cylinder, a medium is introduced through the external driving interface to drive extension and retraction of the inner cylinder in the outer cylinder, a conical surface is provided at another end of the universal ball joint, the conical surface facilitates insertion into the receptacle mechanism, a ball joint seal ring is provided at a circumference of the conical surface, an inserted seal between the telescopic mechanism and the receptacle mechanism is implemented by the ball joint seal ring, a channel is opened in the universal ball joint, and the channel is joined to the inner cylinder.

2. The special container for battery transport according to claim 1, wherein the firefighting pipeline comprises a liquid discharge firefighting pipe, an end of the liquid discharge firefighting pipe is in communication with an interior of the container body, an on-off valve is arranged at a discharge end of the liquid discharge firefighting pipe, the on-off valve is configured to control whether the discharge end of the liquid discharge firefighting pipe discharges the fire extinguishing agent outside, and the on-off valve is a manual valve or an electric valve or a manual electric valve.

3. The special container for battery transport according to claim 2, wherein a liquid discharge port is provided in the container body, the telescopic mechanism of one of the connection devices is fixedly connected to the liquid discharge port, and the liquid discharge firefighting pipe is in communication with the interior of the container body through the telescopic mechanism.

4. The special container for battery transport according to claim 3, wherein the liquid discharge port is provided at the bottom of the container body.

5. The special container for battery transport according to claim 3, wherein the receptacle mechanism of the one of the connection devices is mounted on the liquid discharge firefighting pipe, one end of the telescopic mechanism extends to an exterior of the container body to connected to the receptacle mechanism, another end of the telescopic mechanism extends to the interior of the container body.

6. The special container for battery transport according to claim 1, wherein the firefighting pipeline comprises a liquid feed firefighting pipe, a liquid feed port is provided at the top of the container body, the liquid feed firefighting pipe is connected to an interior of the container body, the receptacle mechanism of another of the connection devices is mounted on the liquid feed port, and the telescopic mechanism of the other of the connection devices is mounted on the liquid feed firefighting pipe.

7. The special container for battery transport according to claim 1, wherein the receptacle mechanism comprises a connection piping and a universal ball joint holder, one end of the connection piping is mounted in the universal ball joint holder, another end of the connection piping is connected to the container body, a conical frustum and a circular through hole are provided in the universal ball joint holder, the conical frustum and the circular through hole are joined and penetrate a length direction of the universal ball joint holder, the conical frustum facilitates the insertion of the telescopic mechanism, and the circular through hole and the connection piping are joined to form a fire extinguishing agent flow channel.

8. The special container for battery transport according to claim 1, wherein the fire extinguishing system comprises a driving device and a fire extinguishing agent supply source, the driving device is arranged in an exterior of the container body, the driving device is connected to the fire extinguishing agent supply source, and the driving device supplies power for introducing the fire extinguishing agent from the fire extinguishing agent supply source to an interior of the container body.

9. The special container for battery transport according to claim 1, wherein the fire extinguishing system comprises a detection device, the detection device detects a fire in the container body, the detection device is mounted at an upper portion in an interior of the container body, and the detection device is a combination of various single detectors or a composite detector or a video detector or a grating detector or an infrared detector.

10. The special container for battery transport according to claim 1, wherein the fire extinguishing system comprises a controller, a liquid level device, and a power supply device, the liquid level device is mounted in an interior of the container body, a horizontal mounting height of the liquid level device is not lower than a maximum horizontal plane of cargo in the container, the liquid level device is respectively electrically connected to the power supply device and the controller, the liquid level device transmits a liquid level in the interior of the container body to the controller in real time, and the controller determines, based on a change in the liquid level, whether to continue to convey the fire extinguishing agent into the container body.

* * * * *